United States Patent [19]
Ito et al.

[11] Patent Number: 5,769,050
[45] Date of Patent: Jun. 23, 1998

[54] PRECHAMBER FOR DIESEL ENGINE

[75] Inventors: Hideaki Ito; Hiroshi Hasegawa, both of Iwata, Japan

[73] Assignee: Yamaha Hatsudoki Kabushiki Kaisha, Iwata, Japan

[21] Appl. No.: 658,600

[22] Filed: Jun. 5, 1996

[30]      Foreign Application Priority Data

Jun. 5, 1995  [JP]  Japan .................................. 7-137903

[51] Int. Cl.$^6$ .................................................. F02B 19/08
[52] U.S. Cl. .......................... 123/257; 123/259; 123/263; 123/286
[58] Field of Search .................... 123/257, 259, 123/262, 263, 286

[56]            References Cited

U.S. PATENT DOCUMENTS

| 4,006,720 | 2/1977 | Sato et al. | 123/263 |
| 4,038,952 | 8/1977 | Nagano | 123/259 |
| 4,141,324 | 2/1979 | Karaba | 123/259 |
| 4,204,484 | 5/1980 | Miura | 123/259 |
| 4,434,758 | 3/1984 | Grammes | 123/286 |
| 4,774,919 | 10/1988 | Matsuo et al. | 123/257 |

FOREIGN PATENT DOCUMENTS

| 0636773 | 2/1995 | European Pat. Off. . |
| 2559108 | 7/1977 | Germany . |
| 3415823 | 10/1984 | Germany . |
| 1196790 | 7/1970 | United Kingdom . |
| 2200949 | 8/1988 | United Kingdom . |

OTHER PUBLICATIONS

Patent Abstracts of Japan, vol. 016, No.141 (M–1232) 9 Apr. 1992 & JP–A–04 001429.
Patent Abstracts of Japan, vol. 007, No. 047 (M–196) 2 Feb. 1983 & JP–A–57 195819.
Patent Abstracts of Japan, vol. 009, No.018 (M–353) 25 Jan. 1985 & JP–A–59 165821.

*Primary Examiner*—Andrew M. Dolinar
*Attorney, Agent, or Firm*—Knobbe, Martens, Olson & Bear LLP

[57]            ABSTRACT

A number of embodiments of precombustion chamber configurations for two-cycle crankcase compression diesel engines. The precombustion chamber and its communicating throat are oriented so as to maintain a uniform fuel distribution in the precombustion chamber and to provide good flow into the main combustion chamber that will provide a homogeneous mixture without the flow being directed toward the exhaust port at the time the exhaust port is open. A number of embodiments show constructions that permit uniformity of tumble action in the precombustion chamber and a high velocity for the tumble action to improve turbulence and mixing. All of these factors go together to reduce NOx emissions.

13 Claims, 7 Drawing Sheets

PRECHAMBER FOR DIESEL ENGINE

BACKGROUND OF THE INVENTION

This invention relates to a diesel engine and more particularly to an improved prechamber relationship for such engines.

Many forms of diesel engines use precombustion or torch chambers to assist in the imitations of combustion. These torch chambers are generally smaller volume chambers than the main combustion chamber and communicate with the main combustion chamber through a throat. The fuel is injected into the engine primarily into the prechamber where it initially begins to burn. The burning charge then issues from the prechamber through the throat into the main chamber along with the additional fuel injected. In this way, it is possible to run on relatively lean charge and yet have complete combustion.

A number of problems need to be addressed in conjunction with the configuration and operation of such engine. That is, the prechamber should be sized adequately so as to create enough of an initial combustion that will continue to propagate through the main combustion chamber. However, the volume of the precombustion chamber should not, be too large. Also, it is desirable to ensure a configuration for the precombustion chamber so that the mixture distribution therein becomes fairly homogeneous and to ensure complete combustion at the desired combustion rate.

It is, therefore, a principal object of this invention to provide an improved combustion chamber and precombustion chamber relationship for a diesel engine.

It is a further object of this invention to provide an improved configuration for a diesel engine precombustion chamber which is related to the main combustion chamber in such a way as to provide optimum running efficiency under substantially all conditions.

It has been noted that it is desirable to maintain or initiate at least some turbulence in the precombustion chamber at at least the time fuel is injected into it. The orientation of the throat which communicates the precombustion chamber with the main combustion chamber and the volume and shape of the precombustion chamber can be utilized to create this turbulence. However, it is generally desirable in order to achieve the results of aforementioned to have the throat of a lesser cross-sectional area than the total volume of the precombustion chamber. This raises a risk that the turbulence in the precombustion chamber may either be too low and/or may be confined to only a small area of the precombustion chamber. This is undesirable in that it will result in incomplete combustion.

It is, therefore, a still further object of this invention to provide a precombustion chamber and throat arrangement for a diesel engine wherein an adequate volume can be provided for the precombustion chamber and also so that uniform turbulence can be generated in the precombustion chamber.

SUMMARY OF THE INVENTION

The features of this invention are adapted to be embodied in an diesel engine that is comprised of a cylinder bore closed at one end by a cylinder head. A piston reciprocates in the cylinder bore and forms with the cylinder head and cylinder bore a main combustion chamber. A precombustion chamber is formed in the cylinder head and communicates with the main combustion chamber through a throat.

In accordance with a first feature of the invention, the total volume of the precombustion chamber and throat is designed to be within the range of 60% to 95% of the total volume of the sum of the main combustion chamber, precombustion chamber and throat volumes at the time when the piston is at the top dead center position.

In accordance with another feature of the invention, the minimal cross-sectional area of the connecting throat is in the range of 1% to 1.3% to 2.2% of the total cross-sectional area of the cylinder bore.

In accordance with a third feature of the invention, the throat enters into the precombustion chamber in an orientation to generate a tumbling action therein which constitutes swirl about an axis that extends transversely to the cylinder bore axis. The interior surface of the precombustion chamber is formed with a generally continuously extending shoulder area formed around the precombustion chamber in a direction generally perpendicular to the direction of tumble for improving the distribution and magnitude of the tumble in the precombustion chamber.

BRIEF DESCRIPTION OF THE DRAWINGS

FIG. 9 is a cross-sectional view, on a reduced scale, and in part similar to FIGS. 5 and 7 and shows a still further embodiment of the invention.

DETAILED DESCRIPTION OF THE PREFERRED EMBODIMENTS OF THE INVENTION

Figure 1:
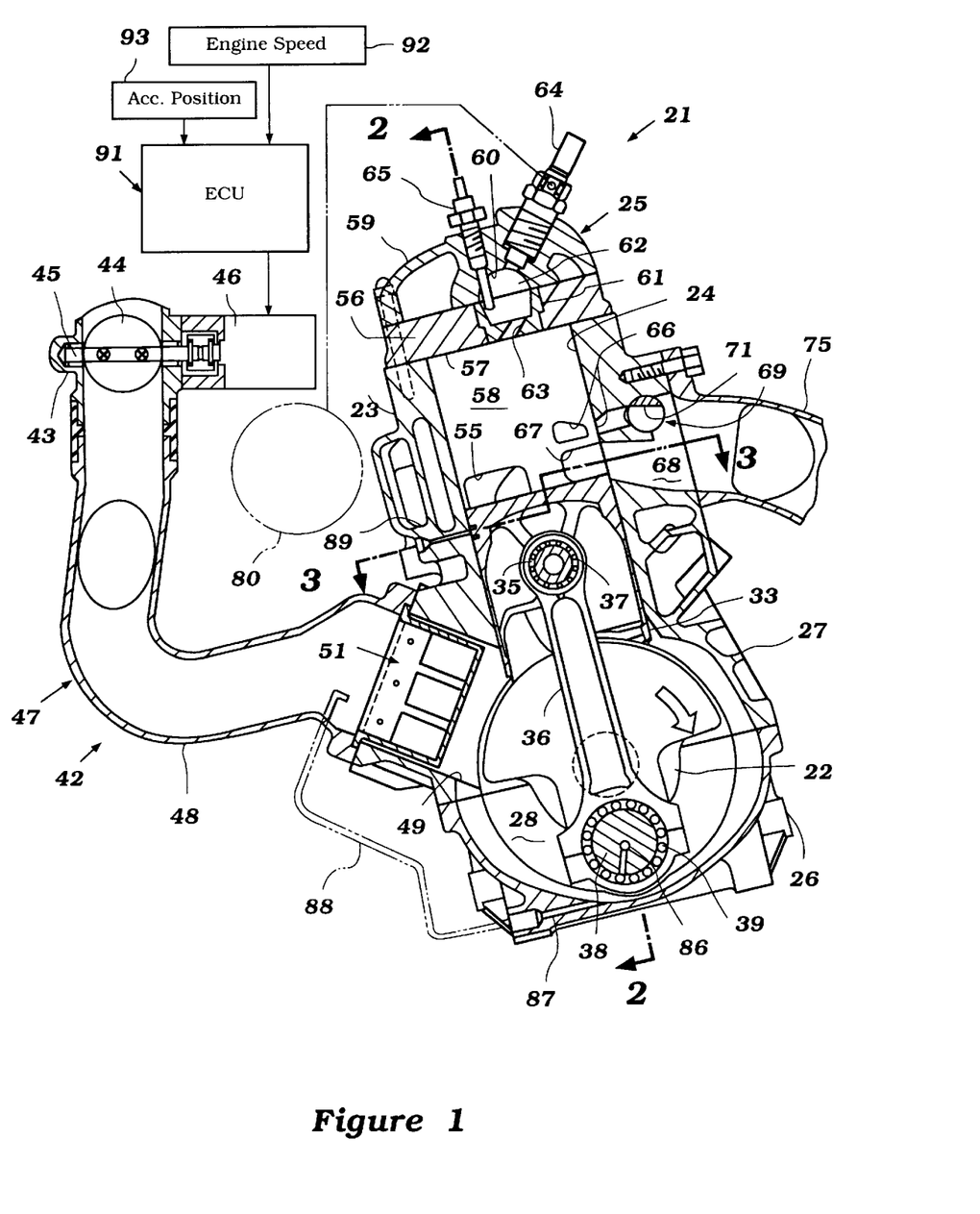
FIG. 1 is a cross sectional view of a two-cycle crankcase compression diesel engine constructed in accordance with an embodiment of the invention taken through the axis of one of the cylinder bores.
Figure 2:
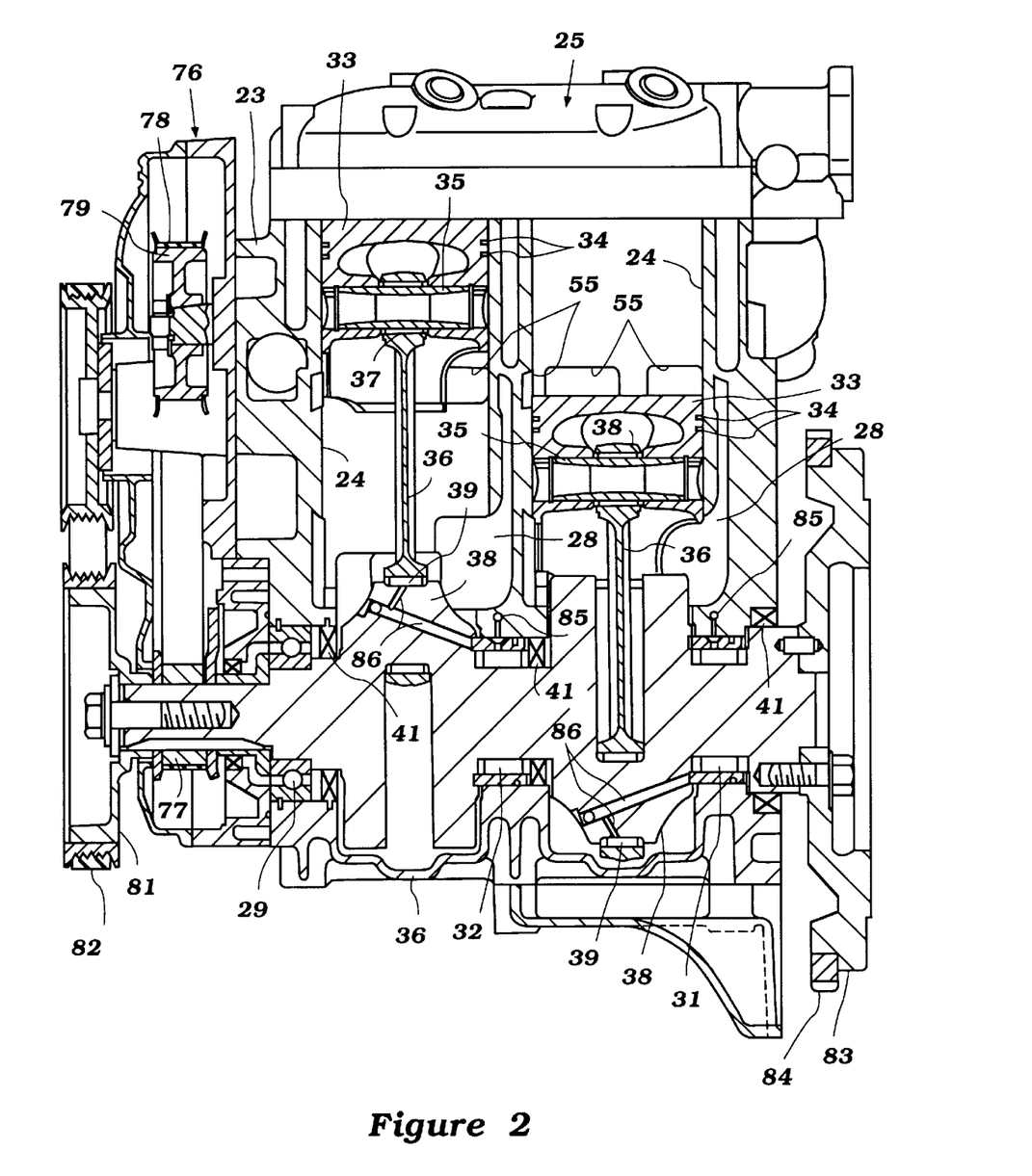
FIG. 2 is an enlarged cross-sectional view taken along the line 2—2 of FIG. 1.
Figure 3:
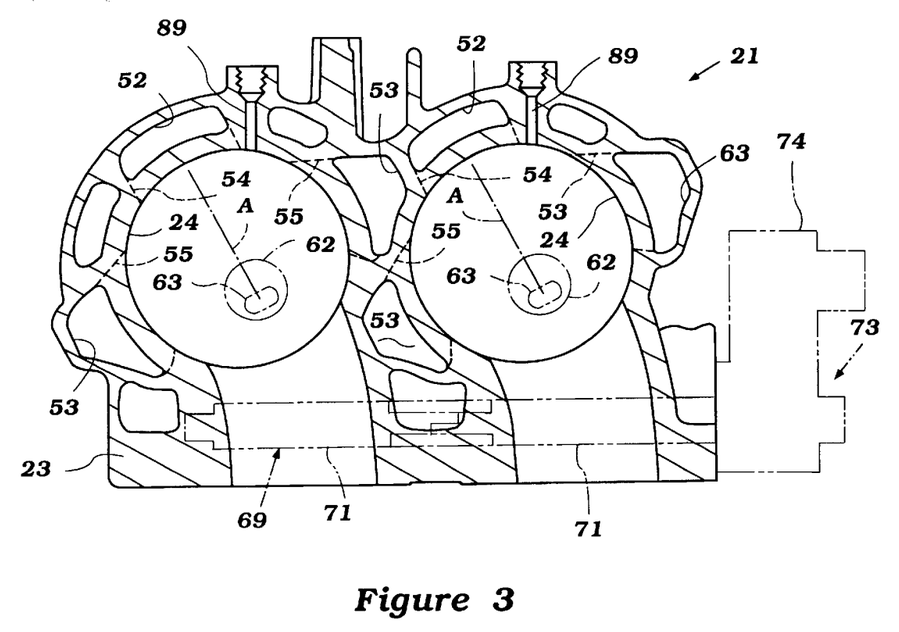
FIG. 3 is an enlarged cross-sectional view taken along the line 3—3 of FIG. 1.

Referring first to FIGS. 1–3, a two-cycle, diesel engine constructed in accordance with the invention is indicated generally by the reference numeral 21. The engine 21 is particularly adapted for use in a motor vehicle positioned so that its output shaft, a crankshaft indicated by the reference numeral 22, rotates about an axis that extends transversely to the longitudinal center line of the vehicle. Although this is a use for which the engine 21 is particularly adapted, those skilled in the are will readily realize that the use of the invention is not so limited. Having this general description of the environment, the engine 21 will now be described in more detail. This description will primarily center, at least initially, on FIGS. 1–3. In the illustrated embodiments, the engine 21 is of the two-cylinder in-line type. It will be apparent, however, to those skilled in the art how the invention may be applied in conjunction with engines having other cylinder numbers and other cylinder configurations.

The engine 21 is comprised of a cylinder block 23 which may be formed from a suitable material and has a number of cylinder bores 24 which is, of course, dependent upon the number of cylinders in the engine. These cylinder bores 24 are disposed so that their axes lie on a plane that is at a slight acute angle to a vertically extending plane. Again, however, the invention is not so limited.

At their upper ends, the cylinder bores 24 are closed by a cylinder head assembly 25 which is of a built-up construction as will be described. The cylinder head assembly 25 is affixed to the cylinder block 23 in a suitable manner. The opposite ends of the cylinder bores 24 are closed by means that includes a crankcase member, indicated generally by the reference numeral 26 which is also affixed to the cylinder block 23 in a suitable manner.

This crankcase member 26 and the skirt 27 of the cylinder block 23 form a plurality of crankcase chambers 28 which contain the crankshaft 22. As may be seen best in FIG. 2, the crankshaft 22 is rotatably journaled in these crankcase chambers 28 by means that include a front main bearing 29, a rear main bearing 31 and an intermediate main bearing 32. The front main bearing 29 is depicted as being of the ball type, while the rear and intermediate main bearings 31 and 32 are depicted as being of needle or roller bearing type. Obviously, other types of bearing arrangements may be employed if desired.

Pistons 33 are supported for reciprocation in each of the cylinder bores 24. These pistons have head portions which are formed with ring grooves that receive at least a pair of piston rings 34 for serving compression and oil control purposes, as is well known in the art. These head portions are also formed with the piston pin bosses that receives piston pins 35. The piston pins 35 provide a pivotal connection to the small ends of connecting rods 36. Needle-type bearings may be interposed in this connection to reduce friction. These bearings are indicated at 37. The big ends of the connecting rods 36 are journaled on throws 38 of the crankshaft 22. Needle bearings 39 are provided at these journals.

As is typical with two-cycle crankcase compression engine practice, the crankcase chambers 28 associated with each of the cylinder bores 24 is sealed from the others and this sealing mechanism includes seals shown at 41. An air intake charge is delivered to the crankcase chambers 28 by means of an induction system, indicated generally by the reference numeral 42 (FIG. 1). In this embodiment, the induction system 42 includes an air inlet device (not shown) which serves a throttle body assembly, indicated generally by the reference numeral 43. The throttle body 43 includes a throttle valve 44 that is mounted on a throttle valve shaft 45. This throttle valve shaft 45 is controlled by a servomotor 46 in a manner which will be described. The throttle valve 44, rather than serving the primary purpose of controlling the engine speed as with a spark ignited engine, acts to control the scavenging flow of air in the engine, in a manner which will be described.

The throttle body 43 serves an intake manifold 47 which has outlet branches 48 each of which communicate with a respective intake port 49 formed in the skirt 27 of the cylinder block 23. As is typical with two-cycle engine practice, a reed-type valve assembly 51 is provided in each intake port 49. These reed-type valves 51 permit air to flow into the crankcase chambers 28 when the pistons 33 are moving upwardly in the respective cylinder bores 24. However, when the pistons 33 move downwardly, the reed-type check valves 51 will close to preclude reverse flow, as is well known in this art.

The charge which is compressed in the crankcase chambers 28 is transferred to the area above the head of the piston 33 through a scavenging system which includes a center scavenge passage 52 and a pair of side scavenge passages 53. As will be noted by reference to FIG. 3, the scavenge passages 52 and 53 are rotated slightly in a counter-clockwise direction as shown in FIG. 3 so that the side scavenge passages 53 between adjacent cylinder bores 24 are staggered relative to each other. This provides clearance between the adjacent side scavenge passages 53 so that the engine 21 may be made shorter or more compact in its length.

The respective scavenge passages 52 and 53 open into the cylinder bore 24 through respective scavenge ports 54 and 55. As will become apparent, this configuration for the scavenging system provides a Schnurl-type scavenging.

Figure 5:
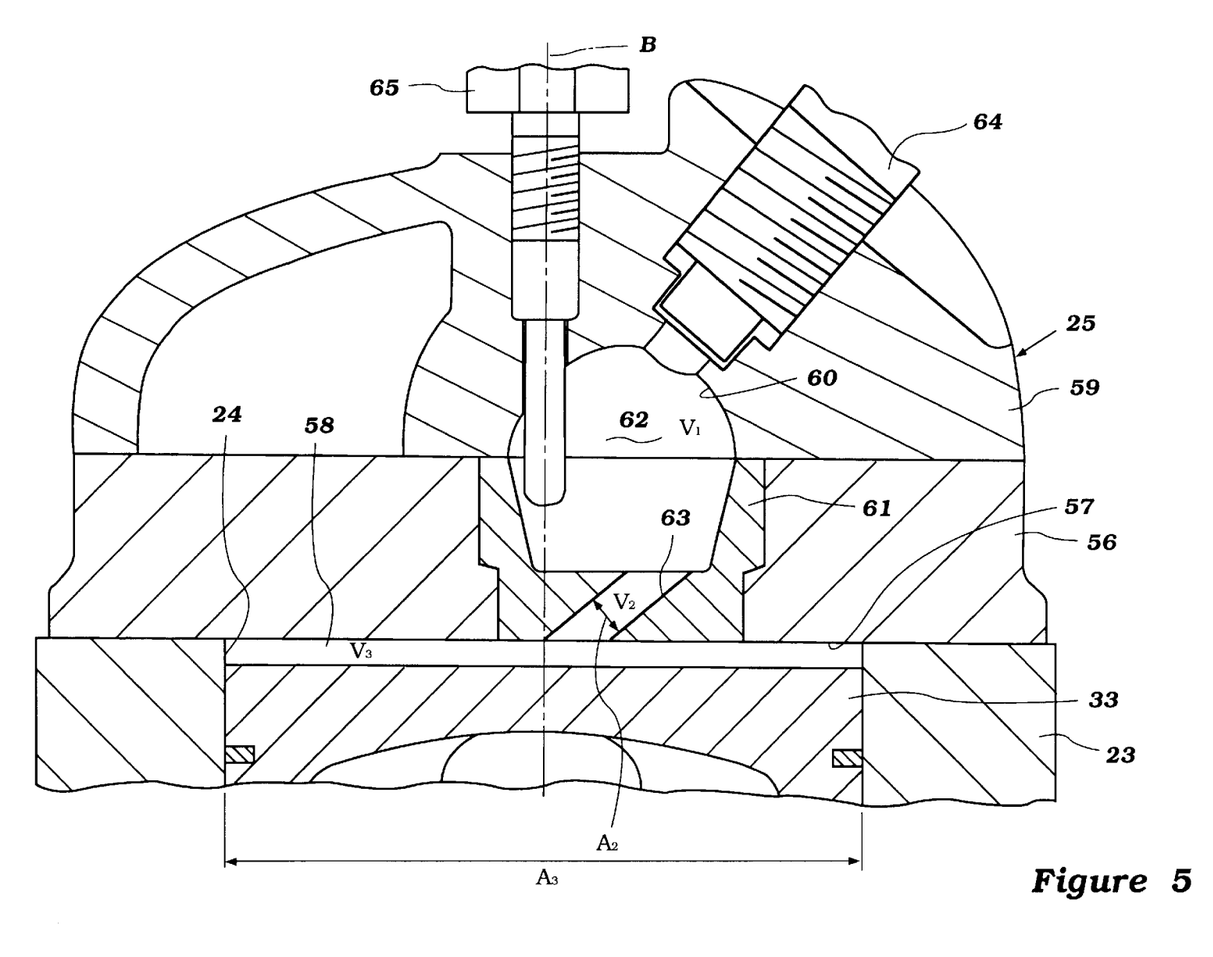
FIG. 5 is an enlarged cross-sectional view taken along the same plane as FIG. 1 and shows the configuration of the precombustion chamber throat and the relationship of the cross-sectional area of the throat to the piston.

Referring now primarily to FIGS. 1 and 5, the construction of the cylinder head assembly 25 will be described. As has been noted, the cylinder head assembly 25 is a multi-part assembly made up primarily of a lower cylinder head plate 56 which has a generally planer lower surface 57. This surface forms a closure for the upper end of the cylinder bores 24 and defines with them and the head of the piston, a main combustion chamber volume 58. This main combustion chamber volume 58 varies cyclicly in displacement, but at the bottom dead center position of the piston 33 as shown in FIG. 1, this volume is a maximum. At top dead center (FIG. 5), this volume is at its minimum.

The remaining main component of the cylinder head assembly 25 is a further cylinder head member 59 which is fixed to the member 56 and cylinder block 23 as aforedescribed. The cylinder head member 56 receives an insert piece 61 and the cylinder head member 59 has a recess 60 which cooperates with this insert piece to define an auxiliary pre-combustion or torch combustion chamber 62.

As may be seen in FIG. 3, these chambers 62 are offset from the cylinder bore axis away from the center scavenge passage 52 and toward an exhaust port arrangement, which will be described shortly. This precombustion or torch chamber 62 communicates with the main combustion chamber 58 through a throat area 63. It should be noted that the throat area 63 is disposed at an angle so that the charge which exits the precombustion chamber 62 into the main combustion chamber 58 will be directed primarily toward the center scavenge port 54 along a line A, although the outer termination of the throat 63 is disposed substantially at the center of the head of the piston 33 when the piston 33 is at its top dead center position. The purpose of this construction will also be described later.

A fuel injector, indicated by the reference numeral 64, is mounted in the cylinder head assembly 25 and sprays into the precombustion or torch chamber 62. The fuel injector 64 is disposed so that it will spray toward one side of the precombustion chamber 62.

As is well know in the diesel art, when the pistons 33 move upwardly in the main combustion chamber 58, the air charge will be compressed in this chamber and the increased pressure transmitted through the throat 63 to the prechamber 62. At an appropriate time, the injector 64 injects fuel which, upon contacting the high pressure, high temperature compressed charge in the prechamber 62 will ignite and expand. This expansion causes a flame torch to issue from the throat 63 into the main chamber 58 along with the continued injected fuel so as to burn in both the prechamber 62 and in the main chamber 58.

In order to assist in initiating combustion under low temperature conditions, a glow plug 65 may be mounted in the cylinder head assembly and has its heating tip exposed in the pre- or torch chamber 62. The glow plug 65 is mounted so that the center of its tip lies on an axis B that is generally on the axis of the cylinder bore 24 and at one side of the prechamber 62.

As the burning gases continue to burn and expand, the pistons 33 will be moved downwardly to cross first an upper auxiliary exhaust port 66 and finally a lower, main exhaust port 67. The exhaust ports 66 and 67 communicate with an exhaust passage arrangement 68 formed in the cylinder block 23.

An exhaust control valve, indicated generally by the reference numeral 69 and having a construction of the type generally known is mounted for rotation in the cylinder block 23. The exhaust control valve 69 has a generally cylindrical portion 71 with a cutout valving area 72 in registry with the auxiliary ports 66. A servomotor mechanism, indicated generally by the reference numeral 73 (FIG. 3) drives the exhaust control valves 71 through a gear train 74. The control strategy is such that, by opening and closing the exhaust control valve 69, it is possible to change the effective compression ratio of the engine. This permits the use of a high compression ratio under low and mid range performance so as to improve the torque and power outputs under this running condition. However, the compression ratio is lowered when the engine speed and load become high, by opening the exhaust control valve 69. This avoids overheating and knocking in the engine under this extreme running conditions.

An exhaust manifold 75 is mounted on the front of the cylinder block 23 and cooperates with the cylinder block exhaust passages 68 so as to collect the exhaust gases. The manifold 75 extends forwardly and downwardly for connection to an appropriate exhaust system for the engine which may include a muffler and/or catalytic converter. The exhaust gases are then discharged to the atmosphere in a known manner.

A timing case 76 is disposed at the front of the engine or, as installed in a vehicle, at one side. This timing case includes a drive for a high pressure fuel pump shown schematically at 80 in FIG. I and which supplies fuel to the fuel injectors 64 in a known manner. As seen best in FIG. 2, a sprocket 77 is affixed to the nose end of the crankshaft 22. This sprocket drives a toothed belt 78 which, in turn, drives a driven sprocket 79. This driven sprocket 79 is coupled to a pump drive shaft of the pump 80.

In addition to the timing drive 76 for driving the high pressure fuel pump 80, a number of other engine accessories and auxiliaries are driven off this end of the crankshaft 22. Therefore, the crankshaft 22 is provided with a drive pulley 81 that is mounted forwardly of the timing case 76 and which drives a serpentine drive belt 82 to drive such accessories as desired.

While continuing to refer to FIG. 2, it will be seen that the end of the crankshaft 22 opposite to that having the drive sprockets 77 and drive pulley 76, is provided with a flywheel 83. A starter gear 84 is affixed to this flywheel 83 and is driven by an electric starter motor (not shown) for starting of the engine 21 in a known manner.

A portion of the lubricating system for the engine 21 will now be described by reference to FIG. 1. Although various types of lubricating systems can be employed, the illustrated embodiment includes an arrangement there are two basic oil supplies to the engine. The first oil supply supplies lubricant under pressure to the crankshaft and connecting rods, while the other lubricant supply delivers lubricant through the cylinder bore to the sliding surfaces of the piston 33 and cylinder bore 24.

The actual delivery to the engine including the pump and metering system may be of a known type. In addition to these positive lubricant supplies, the system also employs a drain arrangement wherein lubricant that collects in the crankcase chambers 28 will be collected and delivered to the induction system upstream of the reed-type valves 51 for circulation within the crankcase chamber and on the underside of the pistons 33.

The crankshaft journal oil supply arrangement will first be described by reference to FIGS. 1 and 2. An oil supply line feeds a main gallery formed in the cylinder block 23 and which has a plurality of supply passages 85, each of which is juxtaposed to a respective one of the rear main bearing 31 and the intermediate main bearing 32. The front main bearing 29 may also be so lubricated, although this bearing may receive lubricant from another source if desired.

In addition to supplying lubricant to the main bearings 31 and 32, the supply passages 85 also communicate with cross-drillings 86 formed in the respective crankshaft throws 38 which, in turn, deliver oil to the big end bearings 39 of the connecting rods 36. Any lubricant which flows in excess will be collected in the crankcase chambers 28 and returned to the induction system through a drain conduit 87 (FIG. 1).

This drain conduit 87 has interposed in it a check valve (not shown) so as to permit oil to flow from the crankcase chambers 28 through a conduit 88 back into the intake manifold 47 upstream of the reed-type check valve 51. The oil thus flowing will act to silence the operation of the reed-type valves. In addition, this oil will be returned back into the circulation system so as to lubricate the underside of the piston 33 and also the connecting rod small end bearing 37 and piston pin 35.

The lubrication of the pistons 33 and, specifically, their skirts by the oil supplied from the source will now be described by primary reference to FIGS. 1 and 3. A supply conduit (not shown) supplies oil to individual ports 89 formed in the side of the cylinder block 23 opposite to the exhaust ports 66 and 67. The supply ports 89 are disposed so that they intersect the cylinder bore 24 at a point which is aligned with approximately the area between the piston rings 34 when the piston 33 is in its bottom dead center position as shown in FIG. 1. When the pistons 33 are at their top dead center positions, the ports 89 still register with the lower portion of the piston skirts and, hence, the sliding surfaces of the piston and cylinder bore 24 will be well lubricated.

Figure 4:
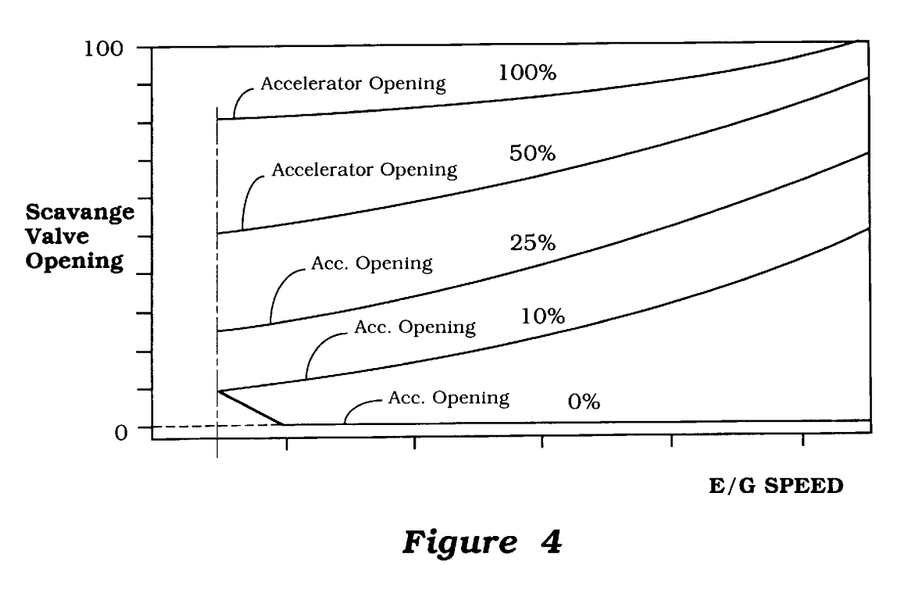
FIG. 4 is a graphical view showing the map which indicates the position of setting of scavenge controlling throttle valve in response to the parameters of engine speed and operator power demand.

Referring now to FIGS. 1 and 4, the strategy by which the scavenge controlling throttle valve 44 is operated will be described. As previously noted, the throttle valve 44 is not primarily designed to control the engine speed, but rather controls the amount of scavenging of the engine. Therefore, the valve 44 and its actuating servomotor 46 is controlled by an ECU, indicated generally by the reference numeral 91. The control strategy is such that the scavenge control throttle valve 44 is positioned at a position that is dependent upon engine speed and engine load.

An engine speed signal is provided by a sensor such as an engine speed sensor 92 of any known type. Engine load is determined by an operator accelerator angle which is sensed by a sensor 93 of a known type. The ECU 91 is programmed with a family of maps like that shown in FIG. 4 so as to determine the angular positioning of the control valve 44 in response to engine speed and engine load.

The map of FIG. 4 contains a number of speed and accelerator angle curves, only the curves for the accelerator angles of zero (idle), 10%, 25%, 50% and full throttle (100%) are shown. From this map, the percentage opening of the scavenge control valve is determined by the ECU 91 and the servomotor 46 is appropriately positioned so as to control the amount of scavenging flow so as to obtain optimum engine performance for the given engine speed and load conditions.

Having thus described the basic construction and operation of the engine 21, the significance of the volume and location of the precombustion chamber 62 and the throat 63 relative to the main combustion chamber volume 58 will be described by particular reference to FIGS. 5 and 6. It has been found that the volume of the prechamber 62 including the volume of the throat 63 bears and important relationship to the total clearance volume of the engine at the top dead center condition which condition as has been noted is seen in FIG. 5. This total clearance volume includes, in addition to the volumes of the precombustion chamber 62 and the throat 63, also the volume of the main chamber 58 at top dead center, which volume is shown in FIG. 5. Preferably, the volume of the prechamber 62 and volume of the throat 63 should fall within the range of 65% to 95% of the total clearance volume. That is, considering $V_1$ as the volume of the precombustion chamber 62, $V_2$ as the volume of the throat and $V_3$ as the volume of the main combustion chamber 58 at top dead center, the following relationship holds true:

$$0.65\sim 0.95=(V_1+V_2)\div(V_1+V_2+V_3).$$

This volume ratio has been found to be very helpful in reducing $NO_x$, and still maintaining good combustion.

Also, as may be seen in FIG. 5, as the piston 33 approaches its top dead center position, the discharge end of the throat 63 into the main combustion chamber volume 58 is centered at the center of the main combustion chamber 58. Thus, as the piston 33 approaches top dead center and when injection and combustion begin, the fuel discharge into the main combustion chamber 58 will be well distributed across the head of the piston and throughout the main combustion chamber 58.

However, as the piston 33 continues its down stroke, the angular disposition of the throat 63 will then cause the combustion products and still unburned fuel to flow across the combustion chamber toward the left-hand side as shown in FIG. 5. Thus, this flow is away from the exhaust ports 66 and 67. Thus, even when the exhaust ports open, the flow of combustion will be in the opposite direction. Of course, the Schnurl-type scavenging will tend to cause the flow to reverse, but this will aid in mixing and still ensure against exit of unburned fuel. Thus, it is possible to obtain substantially better combustion and also to limit the amount of $NO_x$, generated during engine running.

Figure 6:
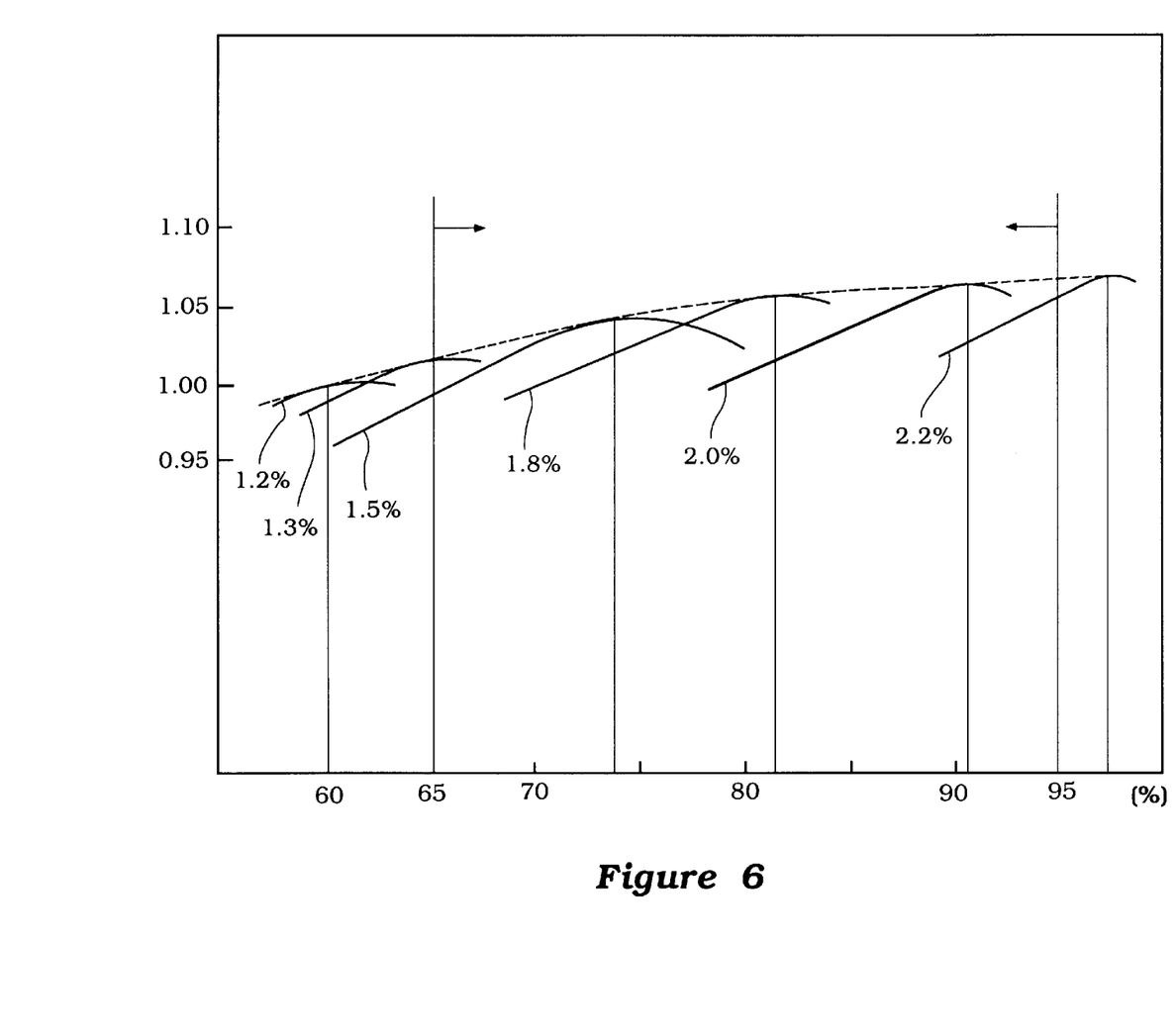
FIG. 6 is a graphical view showing how the ratio of throat diameter to piston cross-sectional area affects the power output of an engine and also the respective power curves based upon the relative ratios of the volume of the precombustion chamber and throat to the total combustion chamber volume, including the main combustion chamber when the piston is at its top dead center position.

Another relationship which is quite important and which may be understood by reference to FIG. 6, is the ratio of the flow area $A_2$ of the throat 63 relative to the total surface area $A_3$ of the main combustion chamber 58. The area $A_3$ is equal to the cross-sectional area of the head of the piston 33, as should be readily apparent. As may be seen, as the ratio $A_2+A_3$ increase, there will be an increase in engine power up to a certain point. The optimum effective ratio is dependent upon the ratio of the aforenoted volumes of the precombustion chamber and throat relative to the total clearance volume as seen in FIG. 6. In order to obtain optimum performance including good $NO_x$, emissions, the range of $A_2$ to $A_3$ should preferably fall within the range of 1.3% to 2.2%. This also improves combustion efficiency and $NO_x$, control.

In addition to the factors already described, it has also been found that the actual configuration of the precombustion chamber 62 is important in improving performance. During the initial upward movement of the piston 33, the air charge is compressed in the prechamber 62. Again, the angular disposition of the throat 63 causes a swirling or tumble action to occur in the precombustion chamber and this swirl or tumble occurs about an axis transverse to the center axis B of the cylinder bore 24. This tumble action is indicated by the arrow R in FIG. 7 which shows another embodiment of the invention utilizing this configuration feature.

Figure 7:
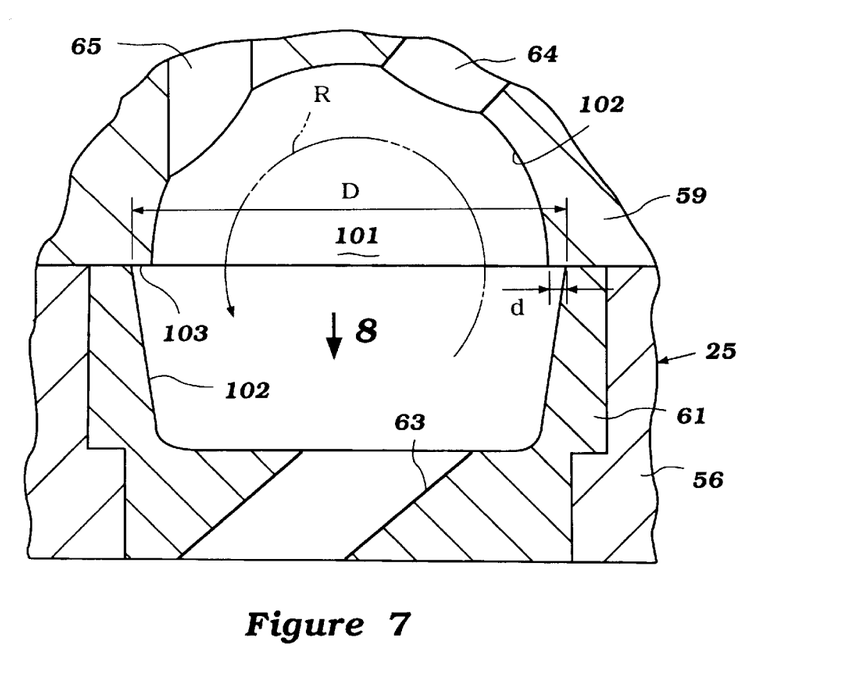
FIG. 7 is an enlarged cross-sectional view, in part similar to FIG. 5, and shows another embodiment of the invention.
Figure 8:
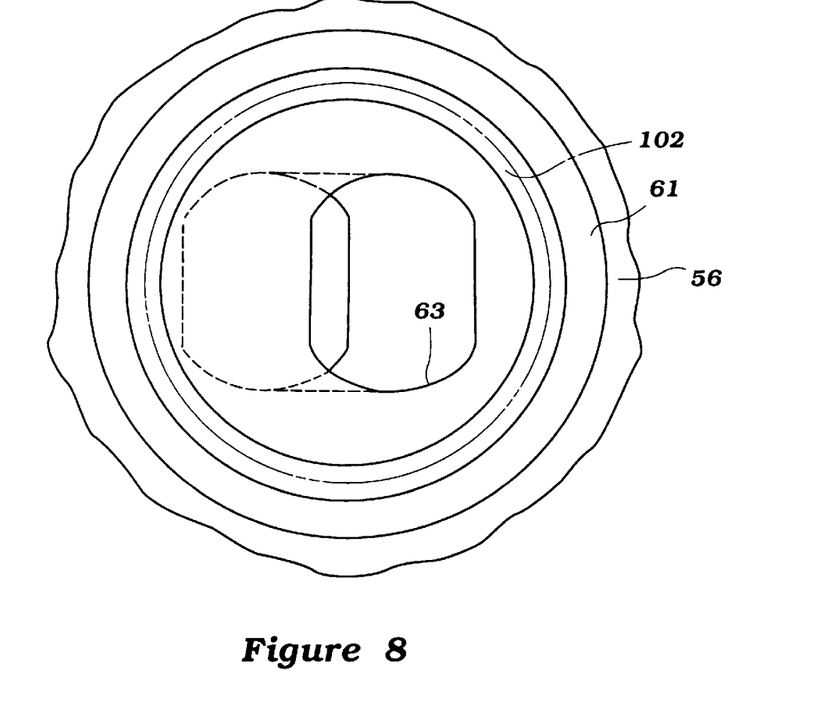
FIG. 8 is a view taken in the direction of the arrow 8 in FIG. 7, and shows the relationship of the shoulder and throat.

Referring now specifically to the embodiments of FIGS. 7 and 8, the general components of the engine which are the same as those previously described have been identified generally by the same reference numerals. New reference numerals will be applied only to portions which have a different configuration from that previously described. Therefore, in this embodiment the precombustion chamber cavity, indicated generally by the reference numeral 101 is configured so as to be made up of a first portion which has a generally spherical configuration and which is formed by a recess 102 formed in the cylinder head member 59. The insert 61 is formed with a somewhat conical cylindrical recess 102 that has a diameter D at its upper end which is slightly greater than the diameter of the spherical recess 102 so as to provide a downwardly facing shoulder 103 that extends at a radial dimension "d" inwardly over the recess 102. It has been found that the provision of the shoulder 103 is effective in not only increasing the tumble velocity in the direction R, but also in ensuring that this tumble motion occurs more uniformly over the total recess 101. Hence, the mixture formed in the precombustion chamber 101 will be more homogenous and a higher velocity of tumble will occur so as to further improve in the reduction of $NO_x$.

Figure 9:
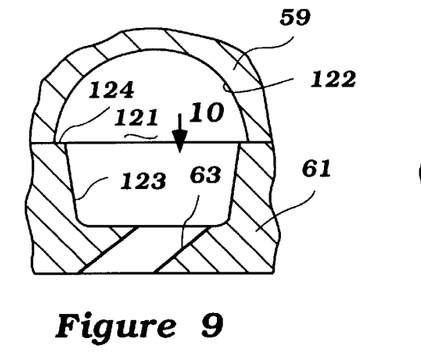
FIG. 9 is a cross-sectional view, in part similar to FIGS. 5 and 7, and shows a yet further embodiment of the invention.
Figure 10:
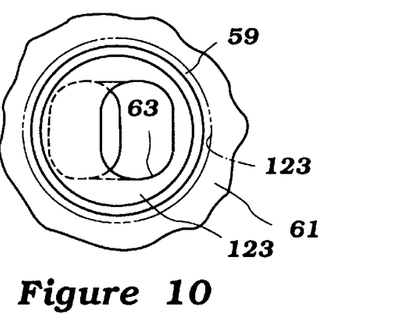
FIG. 10 is a view taken in the direction of the arrow 10 in FIG. 9.

The shoulder may be formed in other ways and next will be described several embodiments that illustrate how the shoulder may be formed. In FIGS. 9 and 10, another embodiment is shown and this differs from the previous embodiments only in the configuration of certain of the components and, therefore, components which are substantially the same have been identified by the same reference numerals.

The precombustion chamber recess, indicated generally by the reference numeral 121, is formed again by a spherical recess 122 formed in the cylinder head member 59 and a generally conical cylindrical recess 123 in the insert. The upper diameter of the recess 123 is smaller than the spherical recess of the spherical recess 122 so as to provide an upwardly facing shoulder 124. Like the shoulder 103 of the previous embodiment, this shoulder extends generally perpendicularly to the direction of tumble and, thus, provides the aforenoted effects.

Figure 11:
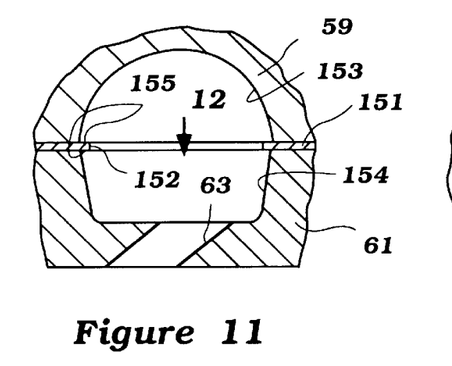
FIG. 11 is a cross-sectional view, in part similar to FIGS. 5, 7 and 9 and shows yet another embodiment of the invention.
Figure 12:
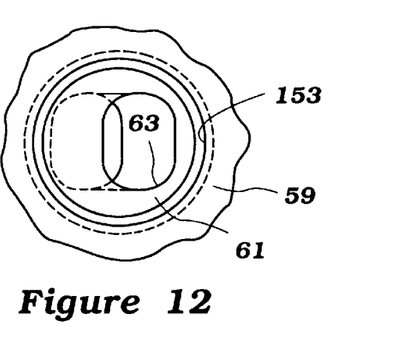
FIG. 12 is a view taken in the direction of the arrow 12 in FIG. 11.

FIGS. 11 and 12 show another way in which the recess may be formed and this utilizes an intermediate member 151 which has a smaller diameter opening 152 than a spherical recess 153 of the cylinder head member 59. The diameter of the opening 152 is also smaller than the conical cylindrical recess 154 of the insert piece 61. The insert piece recess 154 and spherical recess 153 may have the same diameters. Hence, this embodiment forms a pair of shoulders 155 from the insert ring 151 which will provide the aforenoted effects.

Figure 13:
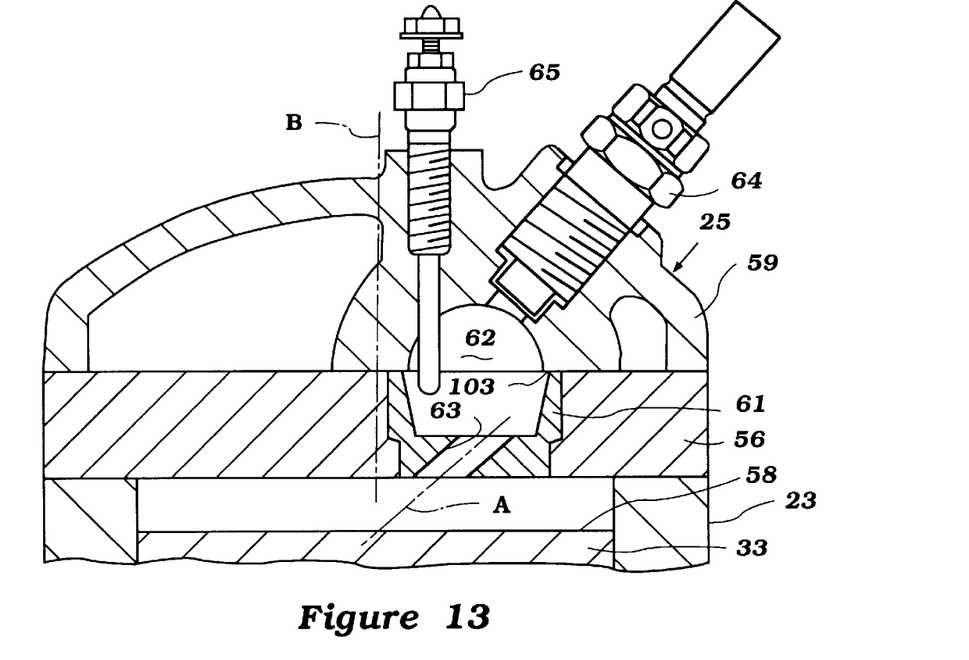
FIG. 13 is a cross-sectional view taken in the same direction as FIGS. 5, 7, 9 and 11, and is on a scale between those FIGS. 5 and 7 and those of FIGS. 9 and 11, and shows the relation of the throat relative to the main combustion chamber for all embodiments.

FIG. 13 is a view which can be considered to be typical of all of the embodiments, but specifically shows a construction as in FIGS. 9 and 10. However, it emphasizes that the flow axis A from the throat 63 is directed toward the center of the piston 33 when it is at its top dead center position, as previously described. Again, and has been previously noted, when the piston 33 moves downwardly, the flow will be directed away from the exhaust ports 76 and 77.

Thus, form the foregoing description, it should be readily apparent that the described embodiments of the invention are very effective in providing combustion chamber configurations for diesel engines using precombustion chambers wherein $NO_x$ is controlled and high power outputs can be obtained due to the homogeneous mixture that is generated and the turbulence which is generated in the prechamber. Of course, the foregoing description is that of preferred embodiments of the invention, and various changes and modifications may be made without departing from the spirit and scope of the invention, as defined by the appended claims.

What is claimed is:

1. A diesel engine comprised of a cylinder block defining a cylinder bore, a cylinder head affixed to said cylinder block and closing one end of said cylinder bore, a piston reciprocating in said cylinder bore and forming with said cylinder bore and cylinder head a main combustion chamber, a precombustion chamber formed in said cylinder head and communicating with said main combustion chamber through a throat, the relationship of the volume of said precombustion chamber and said throat to the total volume at top dead center being expressed by the following relationship:

$$0.6 \sim 0.95 = (V_1 + V_2) \div (V_1 + V_2 + V_3)$$

where:

$V_1$ equals volume of the precombustion chamber;
$V_2$ equals volume of the throat; and
$V_3$ equals volume of the main combustion chamber at TDC, said precombustion chamber being offset to one side of said cylinder bore, said throat being disposed at an angle so that the discharge end of the throat lies substantially on the center of the axis of said cylinder bore, and means for introducing fuel into said precombustion chamber for effecting spontaneous combustion therein.

2. A diesel engine as set forth in claim 1, wherein the effective cross-sectional area of the throat is equal to about 1.3% to 2.2% of the cross-sectional area of the cylinder bore.

3. A diesel engine as set forth in claim 2, wherein there is provided a shoulder in the precombustion chamber for maintaining a more uniform tumble action within the precombustion chamber.

4. A diesel engine as set forth in claim 1, wherein there is provided a shoulder in the precombustion chamber for maintaining a more uniform tumble action within the precombustion chamber.

5. A diesel engine comprised of a cylinder block defining a cylinder bore, a cylinder head affixed to said cylinder block and closing one end of said cylinder bore, a piston reciprocating in said cylinder bore and forming with said cylinder bore and cylinder head a main combustion chamber, a precombustion chamber formed in said cylinder head and communicaticating with said main combustion chamber through a throat, the relationship of the volume of said precombustion chamber and said throat to the total volume at top dead center being expressed by the following relationship:

$$0.6 \sim 0.95 = (V_1 + V_2) \div (V_1 + V_2 + V_3)$$

where:

$V_1$ equals volume of the precombustion chamber;
$V_2$ equals volume of the throat; and
$V_3$ equals volume of the main combustion chamber at TDC, means for introducing fuel into said precombustion chamber for effecting spontaneous combustion therein, said engine operating on a two-cycle crankcase compression principle and wherein there is an exhaust port formed at one side of said cylinder bore.

6. A diesel engine as set forth in claim 5, wherein the precombustion chamber is offset to one side of the cylinder bore and the throat is disposed at an angle so that the discharge end of the throat lies substantially on the center of the cylinder bore axis and faces away from the exhaust port.

7. A diesel engine as set forth in claim 6, wherein the effective cross-sectional area of the throat is equal to about 1.3% to 2.2% of the cross-sectional area of the cylinder bore.

8. A diesel engine as set forth in claim 7, wherein there is provided a shoulder in the precombustion chamber for maintaining a more uniform tumble action within the precombustion chamber.

9. A diesel engine as set forth in claim 5, wherein the effective cross-sectional area of the throat is equal to about 1.3% to 2.2% of the cross-sectional area of the cylinder bore.

10. A diesel engine as set forth in claim 9, wherein there is provided a shoulder in the precombustion chamber for maintaining a more uniform tumble action within the precombustion chamber.

11. A diesel engine as set forth in claim 5, wherein there is provided a shoulder in the precombustion chamber for maintaining a more uniform tumble action within the precombustion chamber.

12. A diesel engine operating on a two cycle crankcase compression principle and comprised of a cylinder block defining a cylinder bore, a cylinder head affixed to said cylinder block and closing one end of said cylinder bore, a piston reciprocating in said cylinder bore and forming with said cylinder bore and cylinder head a main combustion chamber, an exhaust port formed in said cylinder bore, a precombustion chamber formed in said cylinder head and offset to one side of said cylinder bore, said precombustion chamber communicating with said main combustion chamber through a throat disposed at an angle so that the discharge end of said throat lies substantially on the center of the axis of said cylinder bore and facing away from said exhaust port, and means for introducing fuel into said precombustion chamber for effecting spontaneous combustion therein, the effective cross-sectional area of said throat lying in the range of 1.3% to 2.0% of the cross-sectional area of the cylinder bore.

13. A diesel engine as set forth in claim 12, wherein there is provided a shoulder in the precombustion chamber for maintaining a more uniform tumble action within the precombustion chamber.

* * * * *